(12) United States Patent
Herzog et al.

(10) Patent No.: US 7,520,061 B2
(45) Date of Patent: Apr. 21, 2009

(54) MANUALLY GUIDED TRIMMER

(75) Inventors: Markus Herzog, Weinstadt (DE);
Markus Hüsges, Gmund (DE); Thomas Sonnenkalb, Rudersberg (DE); Jürgen Steinmaier, Notzingen (DE);
Kai-Ulrich Machens, Stuttgart (DE)

(73) Assignee: Andreas Stihl AG & Co. KG (DE)

( * ) Notice: Subject to any disclaimer, the term of this patent is extended or adjusted under 35 U.S.C. 154(b) by 0 days.

(21) Appl. No.: 11/404,486

(22) Filed: Apr. 10, 2006

(65) Prior Publication Data
US 2006/0225288 A1    Oct. 12, 2006

(30) Foreign Application Priority Data
Apr. 12, 2005   (DE) ................. 10 2005 016 628

(51) Int. Cl.
*F01P 1/02*    (2006.01)
*F02B 63/02*    (2006.01)
(52) U.S. Cl. ........................... 30/276; 123/41.7
(58) Field of Classification Search ........... 30/123.3, 30/276, 347, 388; 123/41.65, 41.7, 41.69; 451/352, 353, 358, 359
See application file for complete search history.

(56) References Cited

U.S. PATENT DOCUMENTS

| | | | | |
|---|---|---|---|---|
| 4,286,675 A * | 9/1981 | Tuggle | ................. | 173/213 |
| 5,345,684 A * | 9/1994 | Shoup et al. | ................. | 30/276 |
| 5,540,291 A * | 7/1996 | Coleman | ................. | 173/170 |
| 6,394,060 B2 * | 5/2002 | Nagai et al. | ................. | 123/196 R |
| 6,592,059 B2 * | 7/2003 | Ito et al. | ................. | 241/55 |
| 6,622,688 B2 * | 9/2003 | Everts et al. | ................. | 123/195 R |
| 6,640,443 B2 * | 11/2003 | Husges et al. | ................. | 30/276 |
| 6,925,970 B2 * | 8/2005 | Liu et al. | ................. | 123/41.69 |

* cited by examiner

*Primary Examiner*—Timothy V Eley
(74) *Attorney, Agent, or Firm*—Robert W. Becker; Robert Becker & Assoc.

(57) ABSTRACT

A manually guided brushcutter or other trimmer having a guide tube that accommodates a transmission shaft, with a drive motor that drives the transmission shaft and a housing that secures the drive motor to the guide tube. The housing is embodied as a closed engine housing that surrounds the drive motor. The drive motor and the closed engine housing are interconnected at two spaced-apart securement points.

5 Claims, 2 Drawing Sheets

MANUALLY GUIDED TRIMMER

The instant application should be granted the priority date of Apr. 12, 2005, the filing date of the corresponding German patent application 10 2005 016 628.8.

BACKGROUND OF THE INVENTION

The present invention relates to a manually guided brushcutter or similar trimmer having a guide tube that accommodates a transmission shaft, and including a drive motor that drives the transmission shaft and a housing that secures the drive motor to the guide tube.

Manually guided brushcutters have a guide tube in which is rotatably mounted a transmission shaft. Disposed at one end of the guide tube is a tool head having a cutting tool that is driven by the transmission shaft and which can be embodied as a cutting or mowing filament, as a circular saw blade, as a cutting blade, or the like. Provided at the opposite end of the guide tube is a drive motor that drives the transmission shaft and hence the cutting tool. The drive motor, which is in particular embodied as an internal combustion engine having an oscillating, reciprocating piston produces oscillations during operation that in certain speed ranges can lead to considerable vibrations of the overall structure and at the handles.

The drive motor is secured to a housing that in turn is secured to the associated end of the guide tube. Provided between the drive motor and the transmission shaft is a centrifugal clutch that above a prescribed speed establishes a torque-transmitting connection between the drive motor and the transmission shaft. The housing and the centrifugal clutch produce a connection between the motor unit and the guide tube that is not resistant to bending and that reinforces the tendency to oscillate.

It is an object of the present invention to provide a manually-guided trimmer of the aforementioned general type with which it is possible to achieve a reduction of, in particular, oscillations at the handles.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
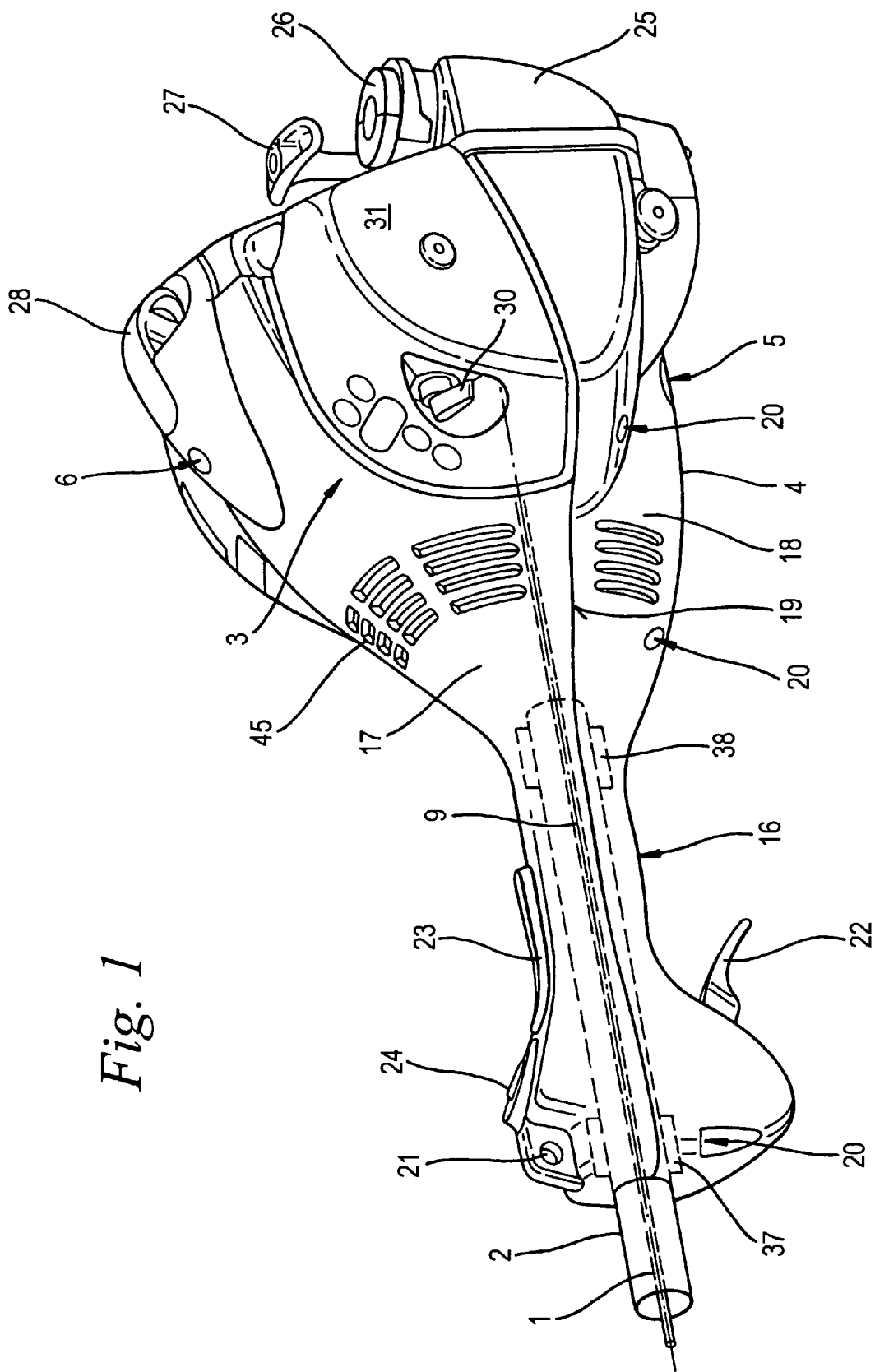
FIG. 1 is a perspective view of a manually-guided trimmer having a closed engine housing and a handle formed thereon for accommodating a guide tube.

The present invention is based on the recognition that the oscillations or vibrations of the overall system are basically determined by the relatively soft connection of the motor to the plastic housing which leads to movements of the motor relative to the housing and hence to flexural vibrations or bending oscillations of the overall machine and the handle system.

Pursuant to the present application, a trimmer is proposed according to which the housing is embodied as a closed engine housing that surrounds the drive motor, whereby the drive motor and the closed engine housing are interconnected at two spaced-apart securement points. The closed shell of the engine housing, and the drive motor itself, form, together with the two spaced-apart securement points, a structural unit that is mutually reinforcing. A single housing section, which taken alone would be thin-walled and which has the corresponding securement point, is prevented from being elastically deformable in that the rigid motor that is secured thereto is supported against a further housing section having the corresponding further securement point. The two housing sections, which taken alone are non-rigid and thin-walled, are joined together by the interposed drive motor to form a sandwich-like, mutually reinforcing, mechanically rigid subassembly in which vibration-induced relative deformations between motor and housing, as well as a relative vibration of the motor assembly in relation to the adjoining end of the guide tube, are prevented. The structural unit is adequately rigid to avoid resonance magnification. An expense for additional anti-vibration elements can be eliminated.

Pursuant to a preferred further development, the two securement points are disposed diametrically opposite one another relative to the drive motor. In particular where the drive motor is preferably a one cylinder reciprocating piston engine having a piston that is reciprocably guided in a direction of stroke, an arrangement is provided where the two securement points are disposed opposite one another in the direction of stroke. The diametrically oppositely disposed arrangement of the securement points maximizes the mutually reinforcing sandwich effect. The spatial orientation in the direction of stroke effects the aimed-at reinforcement gain in that spatial axis which, as a consequence of the stroke movement of the piston, represents the axis of the preeminent vibration excitation.

Pursuant to an expedient further development, the two securement points are disposed at least approximately in a stroke plane of the piston that is disposed transverse to an axis of rotation of the drive motor, whereby one securement point is preferably provided on a crankcase of the reciprocating piston engine, and the other securement point is provided on a cylinder, especially on a cylinder head, of the reciprocating piston engine. The arrangement of the securement points in or at least close to the stroke plane produces a support in the immediate vicinity of where the vibration excitation is generated, thus effectively suppressing the formation of vibration responses. At the same time, the support is disposed at least approximately in the region of the center of mass of the drive motor. Eccentricities, and thereby formed vibrations having additional axes of freedom and/or higher orders, are eliminated. The arrangement of the securement points on the crankcase, and diametrically opposite thereto on the cylinder head, leads to a direct support effect. A maximum possible spatial spacing having a correspondingly high reinforcing effect results.

The securement points can be embodied as a snap connection or some other positively engaging or interlocking connection, and are preferably screw connections. The surface pressing of the tightened screws effects a high localized rigidity that with an appropriate design does not weaken even at high excitation oscillation levels.

Pursuant to a preferred further development, at least a portion of the closed engine housing has a double-walled construction. A double-walled portion of the closed engine housing in particular forms an integral tank for an operating material of the reciprocating piston engine. In conjunction with the two spaced-apart securement points, the double-walled construction is a consistent extension of the sandwich principle, with which a localized reinforcement is effected in the vicinity of at least one of the securement points. The reciprocal support effect of the two securement points is supplemented by the localized reinforcement in the vicinity of at least one of the two securement points. In this connection, while maintaining the desired rigidity, the corresponding wall portion can be thin-walled and lightweight. By simultaneously forming the integral tank, for example for fuel, lubricant, or the like, the compact construction that is important for a manually-guided implement is enhanced.

Pursuant to a preferred embodiment, with the closed engine housing a handle is formed thereon by means of which the engine housing is secured to the guide tube. The handle, which extends toward the front in the direction of the tool head, and which surrounds the guide tube as a securement element, makes possible, as an integral component, a mechanically rigid securement of the housing to the guide tube. At the same time, there results in the longitudinal direction of the guide tube a relatively great spacing between the securement point on the guide tube and the two securement points between the drive motor and the engine housing. The aforementioned three securement points have a large spatial separation relative to one another, and span a spatial triangle having a relatively great surface. The geometrically available edge conditions for optimizing the reciprocal reinforcement effect are efficiently taken advantage of.

Pursuant to one expedient embodiment, the closed engine housing is formed by at least two housing halves that are mechanically fixedly interconnected, especially by being screwed together. Assembly and maintenance are easy to accomplish. Screwing the housing halves together effects a detachable structure that is nonetheless rigid and closed during operation, and that has a high rigidity of shape, even with a thin-walled and lightweight construction.

Further specific embodiments of the present application will be described subsequently.

DESCRIPTION OF SPECIFIC EMBODIMENTS

Referring now to the drawings in detail, the perspective view of FIG. 1 shows part of a manually guided brushcutter or similar trimmer in the region of its engine housing 4. This engine housing essentially comprises two housing halves 17, 18, which are joined together along a horizontally extending plane of separation 19. A mechanically fixed connection of the two housing halves 17,18 to one another can be brought about by snap or latch connections or other interlocking means; in the illustrated embodiment, the fixed connection is produced by a plurality of screw locations 20. Disposed in the engine housing 4 is a drive motor 3 that is only indicated in FIG. 1 but is shown in greater detail in FIGS. 2 and 3. Formed on the engine housing 4 is a handle 16 that is monolithically formed with the two housing halves 17,18. A guide tube 2 is held in the handle 16 by being clamped between the two housing halves 17,18 at two securement locations 37, 38 that are axially spaced apart from one another. The two securement locations 37,38 can, as required, be rigid or resilient to a limited extent, for example by the provision of rubber sleeves or the like.

Centrally mounted in the guide tube 2 is a transmission shaft 1 that is rotatable about an axis of rotation 9 and is driven by the drive motor 3. At an end of the guide tube 2 that is opposite the motor end and is here not illustrated is a tool head having a rotatably drivable cutting tool, for example in the form of a cutting filament, a circular saw blade, a cutting blade, or the like. The driving rotational movement of the drive motor 3 is transferred to the cutting tool by means of the transmission shaft 1.

The drive motor 3 can be an electric motor, and in the illustrated embodiment is an internal combustion engine. A fuel tank 25 formed on the lower housing half 18 is closed off by a cap 26 and is provided for storing fuel for the operation of the drive motor 3. Disposed in the rear region of the engine housing 4 is a rope pull starter 27 that enables a manual starting of the drive motor 3. Installed in the upper region of the upper housing half 17 is a spark plug cover 28, the function of which will be described in greater detail in conjunction with FIG. 3. To control the drive motor 3, disposed on the engine housing 4, in the region of the front handle 16, are a gas or throttle lever 22, a throttle stop 23, and an interrupter switch 24 for interrupting ignition. Formed at the front, upper end of the handle 16 is a suspension eye 21, which is provided for mounting a carrying strap.

Disposed in the side region of the upper housing half 17 is a removable air filter cover 31 that covers a non-illustrated air filter for the combustion air of the drive motor 3. Guided outwardly through the air filter cover 31 is a choke lever 30 for bringing a non-illustrated carburetor of the drive motor 3 into a start position.

The engine housing 4 is provided with a plurality of air slots 45, which permit the passage of a cooling air stream for the drive motor 3. The engine housing 4 is otherwise embodied as a closed shell in the mechanical sense, with the shell completely encasing the drive motor 3 as a closed structural unit. The drive motor 3 is secured to the lower housing half 18 and the upper housing half 17 by means of a lower securement point 5 and a diametrically opposite upper securement point 6 respectively.

Figure 2:
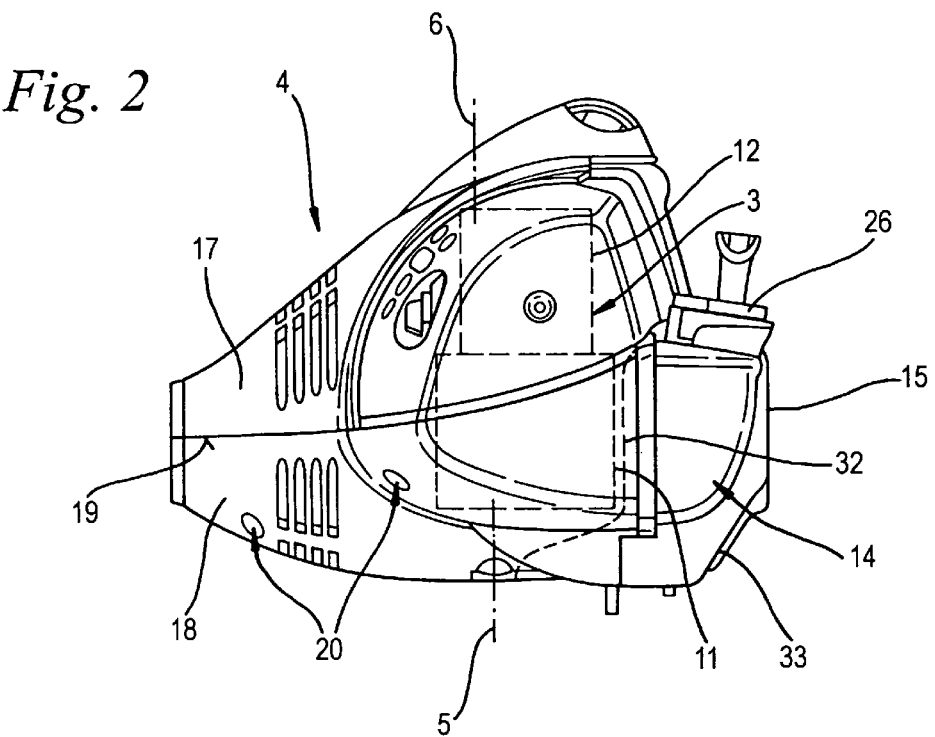
FIG. 2 is a side view of the arrangement of FIG. 1 in the region of the engine housing with an internal combustion engine disposed therein and secured to the housing halves.

FIG. 2 is a side view of the trimmer of FIG. 1 in the region of its engine housing 4. From the schematic block representation of the drive motor 3, it can be seen that it is a one cylinder reciprocating piston engine having a crankcase 11 and a cylinder 12. The lower housing half 18 is connected with the crankcase 11 at a lower securement point 5 while the upper housing half 17 is secured via the upper securement point 6 to the cylinder 12 of the drive motor 3. The two housing halves 17,18, in turn, are fixedly interconnected along the plane of separation 19 at a plurality of screw locations 20, resulting in a rigid structural component composed of the closed engine housing 4 and the mechanically rigid drive motor 3.

Provided in the rear, lower region, is a double-walled section 14 of the engine housing 4 that is formed by an outer wall 33 and an inner wall 32 that is spaced therefrom. The inner wall 32 is connected to the lower housing half 18 in a mechanically fixed and fluid tight manner, as a result of which, in addition to a mechanical reinforcement of the lower housing half 18, an integral tank 15 for an operating material of the reciprocating piston engine is also formed. In the illustrated embodiment, the integral tank 15, which is closed off by the cap 26, is a fuel tank, which is designated by the reference numeral 25 in FIG. 1; however, the integral tank 15 can also be a lubricant tank or the like. It can also be expedient to provide double-walled housing sections in the region of the upper securement point 6, as well as in addition or alternatively thereto, to provide reinforcing ribs or the like in the region of the two securement points 5,6.

Figure 3:
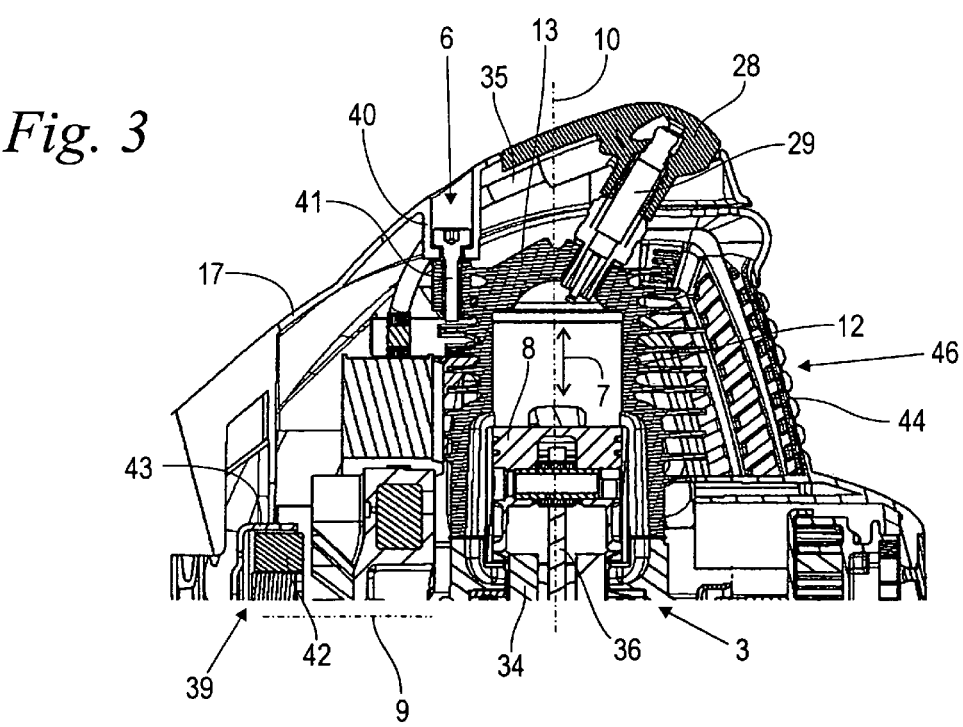
FIG. 3 is an enlarged, cross-sectional view of the arrangement of FIG. 2 in the region of the cylinder of the internal combustion engine showing details of a screw connection between the cylinder head and the housing half secured thereon.

From the cross-sectional view of FIG. 3, which shows a detailed view of the arrangement of FIG. 2 in the region of the upper housing half 17, one can see that the drive motor 3 is a one cylinder reciprocating engine, in the cylinder 12 of which a piston 8 is reciprocably guided in a direction of stroke indicated by the double arrow 7. The stroke movement of the piston 8 is transferred by means of a connecting rod 36 to a crankshaft 34, which is illustrated only partially and rotates about the axis of rotation 9 coaxially to the transmission shaft 1 (FIG. 1). Provided between the drive motor 3 and the transmission shaft 1 (FIG. 1) is a centrifugal clutch 39, the centrifugal bodies 42 of which are fixedly connected with the crankshaft 34. A clutch housing 43 that extends about the centrifugal bodies 42 is fixedly connected with the transmission shaft 1 (FIG. 1). When a prescribed rotational speed is exceeded, the centrifugal bodies 42, as a consequence of their centrifugal force, rest on the radially inner side against the clutch housing 43 and produce a torque-transmitting connection between the crankshaft 34 and the transmission shaft 1 (FIG. 1).

Screwed into a cylinder head 13 that is monolithically formed on the cylinder 12 is a spark plug 29 onto which is placed the spark plug cover 28 as an integrated spark plug connector having an ignition cable 35 for the supply of high voltage. The spark plug cover 28 thereby closes off an appropriate opening in the upper housing half 17. Furthermore, in addition to the air slots 45 (FIG. 1), the upper housing half 17 is provided in its rear wall 44 with further air slots 46, which are formed by a grating structure of the rear wall 34. The air slots 45, 46 permit the passage of a cooling air stream, which is conveyed by a non-illustrated fan, and which is conveyed past the ribbed cylinder 12 for cooling purposes. Despite the presence of the air slots 45, 46, and the opening for the spark plug 29 that is closed off by the spark plug cover 28, the upper housing half 17, together with the lower housing half 18 (FIGS. 1, 2), form an engine housing 4 that is closed in the mechanical sense, and that at least nearly completely surrounds the drive motor 3.

The stroke movement of the piston 8 in the direction of stroke 7 forms a stroke plane 10 that is disposed transverse to the axis of rotation 9 and extends through the plane of movement of the connecting rod 36. The upper securement point 6, and the lower securement point 5 shown in FIG. 2, are preferably disposed in the stroke plane 10 and in the illustrated embodiment, relative to the axial direction of the crankshaft 34, are disposed at least in the immediate vicinity of the stroke plane 10. For this purpose, an inwardly recessed screw dome 40 is formed into the upper housing half 17. The screw dome 40 accommodates a threaded screw 41 that is screwed into a threaded section of the cylinder head 13 and presses the screw dome 40 against the surface of the cylinder head 13. The securement point 5 on the crankcase 11, which is shown in FIG. 2 and is diametrically opposite the securement point 6 relative to the direction of stroke 7, has the same construction. Alternatively, or in addition thereto, snap connections or the like can also be provided for forming the securement points 5, 6. The drive motor 3 is thus attached to the closed engine housing 4 at the securement points 5,6, and at the same time acts as a reinforcing support element between the upper housing half 17 and the lower housing half 18 in the direction of stroke 7. The mechanically essentially rigid structural component composed of the engine housing 4 and the drive motor 3 is, in turn, secured to the guide tube 2 at the securement locations 37, 38 (FIG. 1). Instead of the aforementioned 2-point securement at the guide tube 2 together with the two securement locations 37,38, a 1-point securement of the engine housing 4 to the guide tube 2, for example at the rear securement location 38, can also be provided, whereby the handle 16 can also be a separate component.

In addition to the two illustrated securement points 5, 6, two or more upper securement points 6 and/or lower securement points 5 can also be provided. Alternatively, or in addition thereto, it can also be expedient to provide diametrically oppositely disposed securement points transverse to the direction of stroke 7 (FIG. 3).

The specification incorporates by reference the disclosure of German priority document 10 2005 016 628.8 filed Apr. 12, 2005.

The present invention is, of course, in no way restricted to the specific disclosure of the specification and drawings, but also encompasses any modifications within the scope of the appended claims.

We claim:

1. A manually guided trimmer, comprising:
a guide tube that accommodates a transmission shaft;
a drive motor that is adapted to drive said transmission shaft, wherein said drive motor is a reciprocating piston engine having a piston that is reciprocably guided; and
a housing that is secured to said guide tube, wherein said housing is a closed engine housing that surrounds said drive motor, further wherein said closed engine housing is formed by at least two housing halves that are mechanically fixedly connected to one another, further wherein said guide tube is held between said two housing halves, further wherein said drive motor and said closed engine housing are interconnected at two spaced-apart securement points, further wherein said securement points are screw connections, wherein said two securement points are located opposite one another relative to said drive motor as viewed in the direction in which said piston is reciprocably guided, and wherein said drive motor is secured to one of said housing halves by means of one of said securement points and is secured to the other of said housing halves by means of the other of said securement points.

2. A trimmer according to claim 1, wherein said reciprocating piston engine is a one cylinder engine.

3. A trimmer according to claim 1, wherein said two securement points are disposed at least approximately in a stroke plane of said piston, and wherein said stroke plane is disposed transverse to an axis of rotation of said drive motor.

4. A trimmer according to claim 3, wherein one of said securement points is provided on a crankcase of said reciprocating piston engine, and wherein the other securement point is provided on a cylinder of said reciprocating piston engine.

5. A trimmer according to claim 4, wherein said other securement point is provided on a cylinder head of said cylinder.

* * * * *